Figure 1:
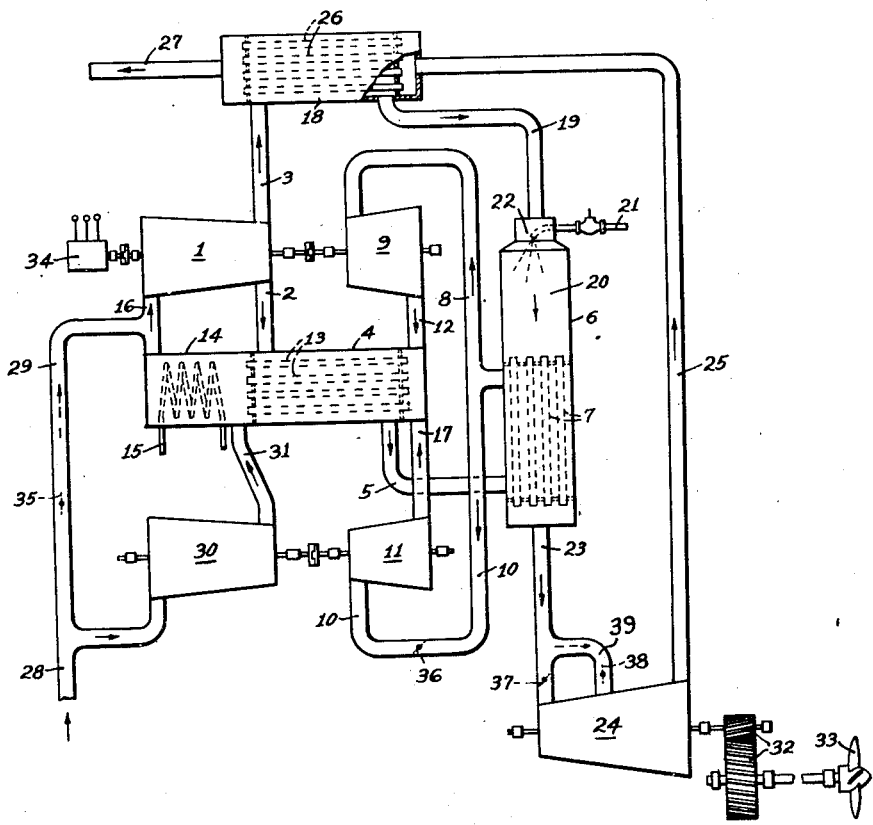

March 8, 1949.  E. GRAF  2,463,964
GAS TURBINE PLANT EMPLOYING MAKE-UP
AIR PRECOMPRESSION FOR PEAK LOADS Filed Aug. 21, 1946  2 Sheets-Sheet 1

INVENTOR
Emil Graf
BY
Pennie, Edmonds, Morton & Barrows
ATTORNEYS

March 8, 1949.  E. GRAF  2,463,964
GAS TURBINE PLANT EMPLOYING MAKE-UP
AIR PRECOMPRESSION FOR PEAK LOADS
Filed Aug. 21, 1946  2 Sheets-Sheet 2

INVENTOR
Emil Graf
BY
Pennie, Edmonds, Morton & Barrows
ATTORNEYS

Patented Mar. 8, 1949

2,463,964

UNITED STATES PATENT OFFICE 2,463,964

GAS TURBINE PLANT EMPLOYING MAKE-UP AIR PRECOMPRESSION FOR PEAK LOADS

Emil Graf, Winterthur, Switzerland, assignor to Sulzer Freres, Societe Anonyme, Winterthur, Switzerland Application August 21, 1946, Serial No. 691,991
In Switzerland November 3, 1945

10 Claims. (Cl. 60—49)

This invention relates to a gas turbine plant of the type in which air flowing in a circuit is compressed by a compressor in the circuit, heated by heat exchange in an air heater in the circuit, expanded in a turbine in the circuit that drives the circuit compressor and then led back to the circuit compressor and in which a quantity of air is continually taken from the circuit as combustion air for the air heater and replaced by a quantity of air introduced from the atmosphere, whilst the combustion gas from the air heater is expanded in a useful output turbine.

The invention is characterised in that for introducing the make-up air not only a charging compressor is provided, but also a by-pass pipe passing round the charging compressor, and that further the charging compressor is driven by a charging turbine which is driven by air in the circuit, and finally that deviating members are arranged in such a way that, either the make-up air is introduced through the by-pass piping and the introduction of circuit air to the charging turbine is interrupted, or the make-up air is introduced through the charging compressor and the charging turbine is supplied with circuit air.

Gas turbine plants according to the invention are suitable particularly for all cases where, in addition to a continuous output of the highest efficiency, maximum outputs at equally good efficiency are demanded, which amount to several times the power of the continuous output. Such plants come into application principally for driving ships, particularly warships which require a power for forced speeds, this power amounting to many times the output for cruising speed.

The exhaust air from the charging turbine is led back into the circuit. The turbine in the circuit and the charging turbine may be arranged in parallel in the current of air in the circuit. The circuit turbine however, may also be connected in series with the charging turbine, one turbine being designed for low pressure and the other, for high.

It is preferable to employ a recuperator in which the exhaust gas from the useful output turbine preheats the combustion air of the air heater; this essentially improves the efficiency of the plant, particularly when working without the charging compressor. The useful output turbine can be fitted with a by-pass pipe past a part of its high-pressure stages and having a closing member; by means of this piping the cross-sectional area of flow available for the exhaust gases of the air heater is increased when shutting down the charging turbine. By means of this arrangement the occurrence of pumping phenomena in consequence of too much throttling in the circuit compressor can be prevented. The same effect can also be obtained if the useful output turbine is provided with a separate high-pressure part which is passed by a by-pass pipe when shutting down the charging turbine. It is then preferable to couple the shaft of the high pressure part to the driving shaft by means of a clutch coupling.

Figure 2:
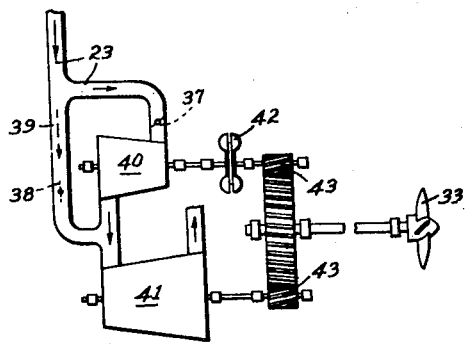
Figure 3:
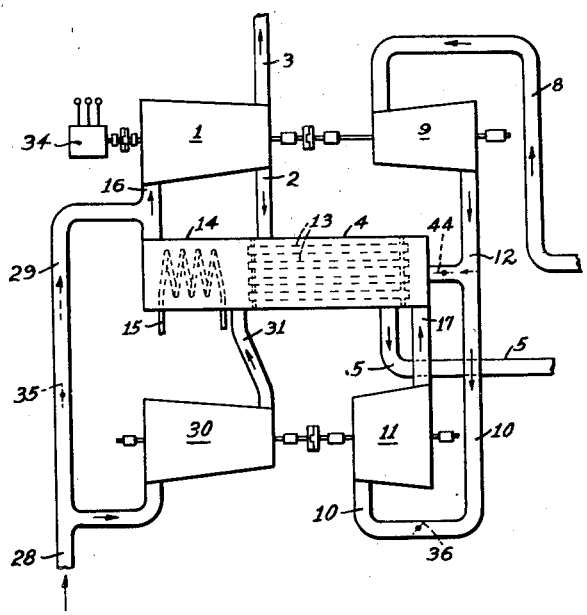
Figure 4:
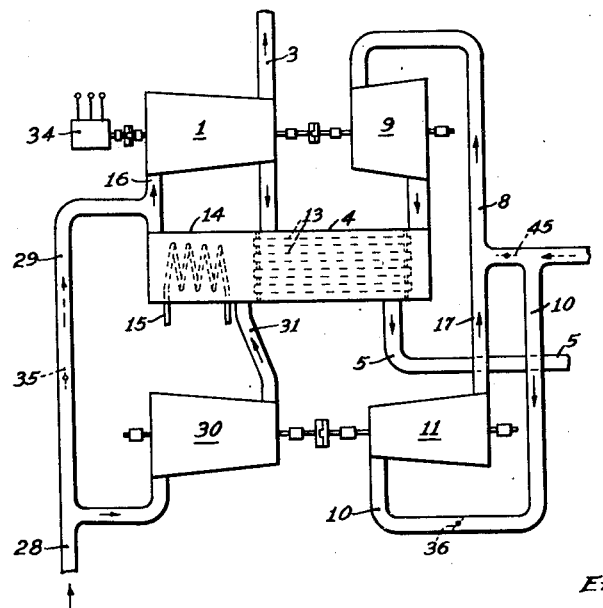

The invention is further explained below with the help of the drawings in which:

Fig. 1 shows diagrammatically a gas turbine plant according to the invention; and Figs. 2, 3 and 4 illustrate diagrammatically variants of some details of the plant shown in Fig. 1.

The air compressed by the circuit compressor 1 (Fig. 1) is led away partly through pipe 2 and partly through pipe 3. The part led away through pipe 2 is delivered through the recuperator 4 and pipe 5 into the air heater 6. When flowing round heat exchanging tubes 7 in air heater 6 this air is heated and can then in the heated state pass partly through pipe 8 into the circuit turbine 9 and partly through pipe 10 into the charging turbine 11. Through pipe 12 the air from the circuit turbine 9 flows back into recuperator 4, where, flowing through heat exchange tubes 13, it gives up a part of its residual heat to the compressed air coming from the circuit compressor 1. A further part of its residual heat is given up in the cooler 14 to a cooling medium flowing through the cooling system 15, and the air then is delivered back again in a cooled state through pipe 16 into the circuit compressor 1, and the circuit described commences anew. The air issuing from the charging turbine 11 flows through pipe 17 into recuperator 4 also, where it unites with the air coming from pipe 12 and finally, together with it, is led back cooled to the circuit compressor 1 again.

From the air flowing round in the circuit a certain quantity is continually extracted through pipe 3. This extracted air, after preheating in the recuperator 18, is delivered through pipe 19 into combustion space 20 of air heater 6 as combustion air. Through pipe 21, a liquid fuel is led to the burner 22. The highly heated combustion gas produced in the combustion chamber 20 flows through the heat exchange tubes 7, thereby heating the air circulating in the circuit. The partly cooled gas then flows through pipe 23 into the useful output turbine 24, and after doing work there, it passes in an expanded state through pipe 25 into recuperator 18. By its passage through the heat exchange tubes 26 of recuperator 18, the combustion air being led to the air heater is preheated. From recuperator 18 finally, the exhaust gases flow away through pipe 27 either to further points where heat can be utilized, or direct to the atmosphere.

As make-up for the quantity of air withdrawn from the circuit, air is again led to the circuit from the atmosphere through pipe 28. This make-up air may be introduced either through pipe 29 direct into the inlet pipe 16 of the circuit compressor 1, or through the charging compressor 30 and pipe 31 into the cooler 14.

The turbine 9, worked by air in the circuit, drives the circuit compressor 1, and the turbine 11, which is also worked by air in the circuit, drives the charging compressor 30. The turbine 24, which is worked with working medium taken from the circuit, produces the useful output of the plant, which is transmitted through the gear 32 and a shaft to the ship's propeller 33. For reversing the direction of motion of the ship, the blades of the propeller are adjustable.

For starting up the plant, and for balancing any excess of output or lack of output, an electric machine 34 is provided, which is coupled to the shaft of circuit compressor 1 and circuit turbine 9 and may work as an electric motor or as an electric generator.

The gas turbine plant illustrated is particularly suitable for propelling warships and intended to develop with the highest efficiency the power required for cruising during the greater part of the working time; it must, however, also be able to develop a multiple of this cruising output for forced speed of the vessel and also at an efficiency which is still good. For changing over from cruising speed to forced speed and vice versa, the change-over valves 35, 36, 37 and 38 are provided. The position of the change-over valves shown in Fig. 1 correspond to working at cruising speed. The make-up air led to the circuit from pipe 28 is delivered direct through pipe 29, at atmospheric pressure or somewhat lower, into pipe 16 of the circuit. Pipe 10 is then closed by the valve 36, so that the turbine 11 and the charging compressor 30 are at rest. In order to prevent any pumping phenomena occurring at the circuit compressor 1, the quantity of combustion gas issuing from the air heater 6 is led through the by-pass pipe 39 to a lower stage of the useful output turbine 24, where it finds a sufficient cross-sectional area of flow to prevent any damming, liable to cause pumping of the compressor. The output is regulated as usual at first by changing the quantity of fuel introduced, and in connection with that by changing the inlet cross-section into the useful output turbine and by throttling the make-up air introduced through pipes 28 and 35, whereby also the speed of the circuit set 1, 9 is altered.

If the plant has to change over to working for forced speed of the vessel, the valves 35 and 38 are closed and the valves 36 and 37 opened. The make-up air to be led to the circuit is now introduced in an increased quantity and in a pre-compressed state by means of the charging compressor 30 through pipe 31 into the cooler 14. Because of this, the pressure level in the whole circuit is raised to a multiple of what it was while working for cruising speed. When issuing from the air heater 6, a part of the heated air now passes through pipe 10 into the turbine 11 driving the charging compressor 30. The combustion gas issuing from the air heater 6 enters the turbine 24 no longer through the by-pass pipe 39, but direct at the high-pressure end of the turbine, so that a multiple of the output developed for cruising speed can be transmitted through the gear 32 to the propeller 33. Regulation while working for forced speed may, as usual, be effected by changing the quantity of fuel and the speed of the charging set 11, 30, whereby the speed of the circuit set 1, 9 is correspondingly changed.

The useful output turbine may, as shown in Fig. 2, be divided into two casings 40 and 41, of which the high-pressure part works through a clutch coupling 42 and the low-pressure part direct on the gear 43. At cruising speed, the quantity of gas issuing through pipe 23 is led through the by-pass pipe 39 direct to the low-pressure part 41, whilst the high-pressure turbine is shut off from the combustion gas supply by the valve 27 and uncoupled from the gear 43 by means of the clutch 42. Turbine 40 then remains at rest, so that windage losses are avoided. For forced speed, valve 37 is opened, valve 38 closed and the clutch coupling 42 engaged. In this way, power is transmitted to the gear 43 and the propeller 33 both from the high-pressure part 40 and the low-pressure part 41. The coupling 42 may be designed as an hydraulic coupling which is filled with liquid for engaging and emptied again for disengaging.

In the variant shown in Fig. 3, only the circuit set 1, 9 and the charging set 11, 30 with the corresponding pipe connections are illustrated. The other parts of the plant are constructed similarly to those in the plant shown in Fig. 1. The plant shown in Fig. 3 differs from the one shown in Fig. 1 in that the circuit turbine 9 and the charging turbine 11 are not arranged in parallel in the circuit, but in series. Through pipe 8, all the air heated in the air heater is led to the circuit turbine 9. After expansion, this air passes through pipe 12 either through the regulating member 44 direct into the heat exchanger 4 when working for cruising speed, or through pipe 10 into the charging turbine 11 when working for forced speed. Changing over from working for cruising speed to working for forced speed is effected by the valves 36, 44. In the position shown in Fig. 3, the exhaust air from the circuit turbine 9 passes directly into the recuperator 4, so that the charging set 11, 30 is at rest and the make-up air passes directly through pipe 29 into the circuit through the opened valve 35. For working for forced speed the valve 36 is opened and the valves 35 and 44 are closed. The charging turbine 11, designed as a low-pressure turbine, then drives the charging compressor 30, so that make-up air is introduced in a compressed state into the circuit through the pipe 31.

In the variant illustrated in Fig. 4 the charging turbine 11 is constructed as a high-pressure turbine, and is arranged before the circuit turbine 9, which is designed as a low-pressure turbine. With the position of the valves 35, 36, 45 shown in Fig. 4, the heated air from the air heater is delivered direct into the low-pressure turbine 9. The charging set 11, 30 remains out of service, and the quantity of make-up air flows from pipe 28 in an uncompressed state into the circuit through the valve 35 and pipe 29. To work for forced speed, the valve 36 is opened and the valves 35 and 45 are closed. The heated air from the air heater then flows through pipe 10 and is delivered first of all to the charging turbine 11 from which it passes through pipes 17 and 8 into the circuit turbine 9 and then through pipe 12 into the recuperator 4. The make-up air is in this case compressed by the charging compressor 30 and led to the circuit through the pipe 31.

I claim:
1. A gas turbine plant comprising an air circuit that includes a circuit compressor, an air heater and a circuit turbine driving the circuit compressor, extraction means for extracting a quantity of air from said circuit and delivering it as combustion air to the air heater, a useful output turbine driven by the combustion gases from the air heater and means to introduce make-up air from the atmosphere into said circuit that include a charging compressor supplied from the atmosphere and delivering to said circuit, a charging turbine driving said charging compressor and driven by air from said circuit, a conduit for admitting air to said circuit without passing through said charging compressor, valve means for interrupting the passage of air through said conduit and valve means for interrupting the delivery of driving air to said charging turbine.

2. A gas turbine plant according to claim 1 in which the exhaust air from the charging turbine is discharged back into the circuit.

3. A gas turbine plant according to claim 1 in which the charging turbine is arranged in the circuit in parallel to the circuit turbine.

4. A gas turbine plant according to claim 1 in which the charging turbine is arranged in the circuit in series with the circuit turbine.

5. A gas turbine plant according to claim 1 in which the circuit turbine is arranged in the circuit as a high-pressure turbine in series with the charging turbine as a low-pressure turbine.

6. A gas turbine plant according to claim 1 in which the charging turbine is arranged in the circuit as a high-pressure turbine in series with the circuit turbine as a low-pressure turbine.

7. A gas turbine plant according to claim 1 in which the extraction means include a recuperator by means of which the exhaust gas from the useful output turbine preheats the combustion air.

8. A gas turbine plant according to claim 1 in which the useful output turbine is provided with a closable by-pass pipe around a part of its high-pressure stages.

9. A gas turbine plant according to claim 1 in which a second higher pressure useful output turbine is connected in the stream of combustion gas from the air heater in series with the first useful output turbine and a closable by-pass is provided around said second useful output turbine.

10. A gas turbine plant according to claim 1 in which a second higher pressure useful output turbine is connected in the stream of combustion gas from the air heater in series with the first useful output turbine and a closable by-pass is provided around said second useful output turbine, and in which the driving shaft of the second useful output turbine is connected to the load by a clutch coupling.

EMIL GRAF.

REFERENCES CITED

The following references are of record in the file of this patent:

UNITED STATES PATENTS

| Number | Name | Date |
| --- | --- | --- |
| 2,374,510 | Traupel | Apr. 24, 1945 |
| 2,399,152 | Traupel | Apr. 23, 1946 |